United States Patent [19]

Sasaki et al.

[11] Patent Number: 5,103,150
[45] Date of Patent: Apr. 7, 1992

[54] INVOLUTE INTERPOLATION ERROR CORRECTION SYSTEM

[75] Inventors: Takao Sasaki, Hachioji; Toshiaki Otsuki; Kunihiko Murakami, both of Hino; Masafumi Sano, Minamitsuru, all of Japan

[73] Assignee: Fanuc Ltd., Minamitsuru, Japan

[21] Appl. No.: 646,717

[22] PCT Filed: May 23, 1990

[86] PCT No.: PCT/JP90/00671

§ 371 Date: Feb. 4, 1991

§ 102(e) Date: Feb. 4, 1991

[87] PCT Pub. No.: WO91/00558

PCT Pub. Date: Jan. 10, 1991

[30] Foreign Application Priority Data

Jun. 28, 1989 [JP] Japan .................. 1-166015

[51] Int. Cl.$^5$ .................................. G05B 19/415
[52] U.S. Cl. .................. 318/568.18; 318/569; 318/570; 318/571; 364/474.31
[58] Field of Search .............. 318/560-636; 364/474.29, 474.30, 474.31, 513; 409/80, 131

[56] References Cited

U.S. PATENT DOCUMENTS 4,893,971 1/1990 Watanabe et al. ............ 409/80
4,926,102 5/1990 Kawamura et al. ......... 409/131 X
4,968,925 11/1990 DeDoncker .................. 318/727

FOREIGN PATENT DOCUMENTS 8810456 12/1988 World Int. Prop. O. ...... 364/474.31
8902111  3/1989 World Int. Prop. O. ...... 364/474.31
8906392  7/1989 World Int. Prop. O. ...... 364/474.31
8906393  7/1989 World Int. Prop. O. ...... 364/474.31

Primary Examiner—Paul Ip
Attorney, Agent, or Firm—Staas & Halsey

[57] ABSTRACT

An involute interpolation error correction system for correcting an error attributable to an involute interpolation of a numerical control device or the like. When machining is effected in accordance with a command for an involute curve (In1), a bite is produced in an actual work shape in the vicinity of a basic circle (C). The start point (Ps3) of this bite, the radius (Rs) from the basic circle (C) and an error amount (De) in the normal direction of the bite are obtained from the work shape, and this data is set as parameters in the numerical control device. The numerical control device allows a cutting along the involute curve (In1) up to the point Ps3, and then cuts along an involute curve (In3) having an end point which is deviated from the point Ps3 by the error amount (De) in the normal direction, whereby a bite-free involute curve machining can be effected.

4 Claims, 3 Drawing Sheets

INVOLUTE INTERPOLATION ERROR CORRECTION SYSTEM

TECHNICAL FIELD

The present invention relates to an involute interpolation error correction system for correcting an error attributable to an involute interpolation of a numerical control device or the like, and more particularly, to an involute interpolation error correction system for correcting an error of a bite or leftover caused when the end point of an involute curve is situated close to a basic circle.

BACKGROUND ART

A curve interpolation of a numerical control device or the like, especially an involute interpolation, is very important when machining gears, and pump blades, etc., and therefore, in general, an involute curve is interpolated by the numerical control device and another computer or an NC program generator, and decomposed into linear data, and a numerical control machining is executed by using a tape containing the data.

In view of the above, the present applicants filed an involute interpolation speed control system, as Japanese Patent Application No. 62-157302 (Japanese Laid-Open Patent Publication No. 64-2106), in which an involute curve is easily interpolated in a numerical control device so that the tangential velocity thereof is constant regardless of the angle.

In this involute interpolation speed control system, the coordinates of a point on the involute curve are given by $$X = R\{\cos(\Theta + \Theta 1) + \Theta \sin(\Theta + \Theta 1) + X_o,$$

$$Y = R\{\sin(\Theta + \Theta 1) + \Theta \cos(\Theta + \Theta 1) + Y_o.$$

$\Theta$ ranging from $\Theta = (\Theta 2 - \Theta 1)$ to $\Theta = (\Theta 3 - \Theta 1)$ is incremented by $$\Theta_{n+1} = \Theta_n + K/(R \cdot \Theta),$$

and a point $(X_{n+1}, Y_{n+1})$ corresponding to this increment is obtained from the above equations, and the difference between this point and the preceding point is obtained, whereby the involute curve is interpolated.

Here R is the radius of a basic circle, and $X_o$ and $Y_o$ are the coordinates of the center of the basic circle.

Thus, the interpolation is made so that the tangential velocity is constant by setting the increment of $\Theta$ at a value, $K/(R \cdot \Theta)$, such that the increment is reduced in inverse proportion to the increase of the angle.

According to the conventional involute interpolation speed control system, however, a bite or leftover occurs in a region where the curvature radius of the involute curve is relatively short, such as the region in the vicinity of the basic circle, due to a servo response delay or thermal deformation of the workpiece.

FIG. 2 is a diagram showing the manner of a machining based on the conventional involute interpolation. In FIG. 2, the basic circle C is a circle which forms the basis of the involute curve. The center O of the basic circle C is given by coordinates $(X_o, Y_o)$, and its radius is given by R.

A point Ps1 is the start point of an involute curve In1, and a point Pe1 is the end point thereof; a point As1 is the start point of an arcuate curve A1, and a point Ae1 is the end point thereof; a point As2 is the start point of an arcuate curve A2, and a point Ae2 is the end point thereof; a point Ps2 is the start point of an involute curve In2, and a point Pe2 is the end point thereof. The respective positional coordinates of these points and the like are previously given as commands to the numerical control device by using a tape or the like.

A tool W is moved interpolatively following a series of program command paths consisting of the involute curve In1, arcuate curve A1, arcuate curve A2, and involute curve In2, but if a machining is actually effected in accordance with this program, the tool W interpolates a path such as the one indicated by dotted line Re, and thus the workpiece is machined to a shape obtained by shaving off the hatched portion from a command work shape, i.e., a shape subject to the bite.

This bite starts at a point Ps3 at a distance corresponding to a curvature radius Rs from the basic circle C, and its depth gradually increases towards the point Pe1. At the point Pe1, the bite depth is equal to a distance De in the normal direction of the involute curve In1. When interpolating the arcuate curve A1, after the end of the interpolation of the involute curve In1, the bite depth gradually decreases toward the point Ae1.

Since this bite is produced at those portions which require a high-accuracy machining, i.e., a small-radius portion of the involute curve In1 and that portion of the arcuate curve A1 which constitutes a joint, it is a serious problem when carrying out the interpolation machining of involute curves by a numerical control device.

The bite effect described above is produced when a convex portion of the involute curve is machined. In contrast, a leftover occurs at a concave portion of the involute curve, and thus the same problem arises.

DISCLOSURE OF THE INVENTION

The present invention has been contrived in consideration of these circumstances, and an object thereof is to provide an involute interpolation error correction system capable of carrying out an involute curve interpolation in which the aforesaid bite or leftover does not occur.

To solve the above problem, according to the present invention, there is provided an involute interpolation error correction system for correcting an error attributable to an involute interpolation of a numerical control device or the like. The involute interpolation error correction system includes, obtaining a curvature radius from a basic circle to a start point of a bite or leftover on a first involute curve and an error amount in a normal direction of the bite or leftover at an end point of the first involute curve, from an actual work shape created in accordance with a command for the first involute curve, if the work shape is liable to cause a bite or leftover, and setting the obtained values as parameters in the numerical control device, whereby the numerical control device makes an interpolation such that the first involute curve is divided between second and third involute curves, the second involute curve having an end point on the start point of the bite or leftover, and the third involute curve having a start point on the start point and having an end point deviated from the end point of the first involute curve by the error amount in the normal direction.

If the actual work shape, created in accordance with the command for the first involute curve, is liable to cause a bite or leftover, the curvature radius from the basic circle to the start point of the bite or leftover on the first involute curve and the error amount in the normal direction of the bite or leftover at the end point of the first involute curve are estimated on the basis of the aforesaid work shape. These estimated values are set as the parameters in the numerical control device, and based on these values, the first involute curve is divided between the second involute curve, which requires no correction, and the corrected third involute curve. More specifically, the first involute curve is divided between the second involute curve, which terminates at the start point of the bite or leftover, and the third involute curve, which starts at the start point and ends at the point deviated from the end point of the first involute curve by the error amount in the normal direction.

Accordingly, the section of the first involute curve which is liable to cause a bite or leftover is changed into the new third involute curve, and if the machining is executed on the basis of the changed involute curve, the tool interpolates the first command path, and thus a work shape free from a bite or leftover can be obtained.

BEST MODE OF CARRYING OUT THE INVENTION

An embodiment of the present invention will now be described with reference to the drawings.

Figure 2:
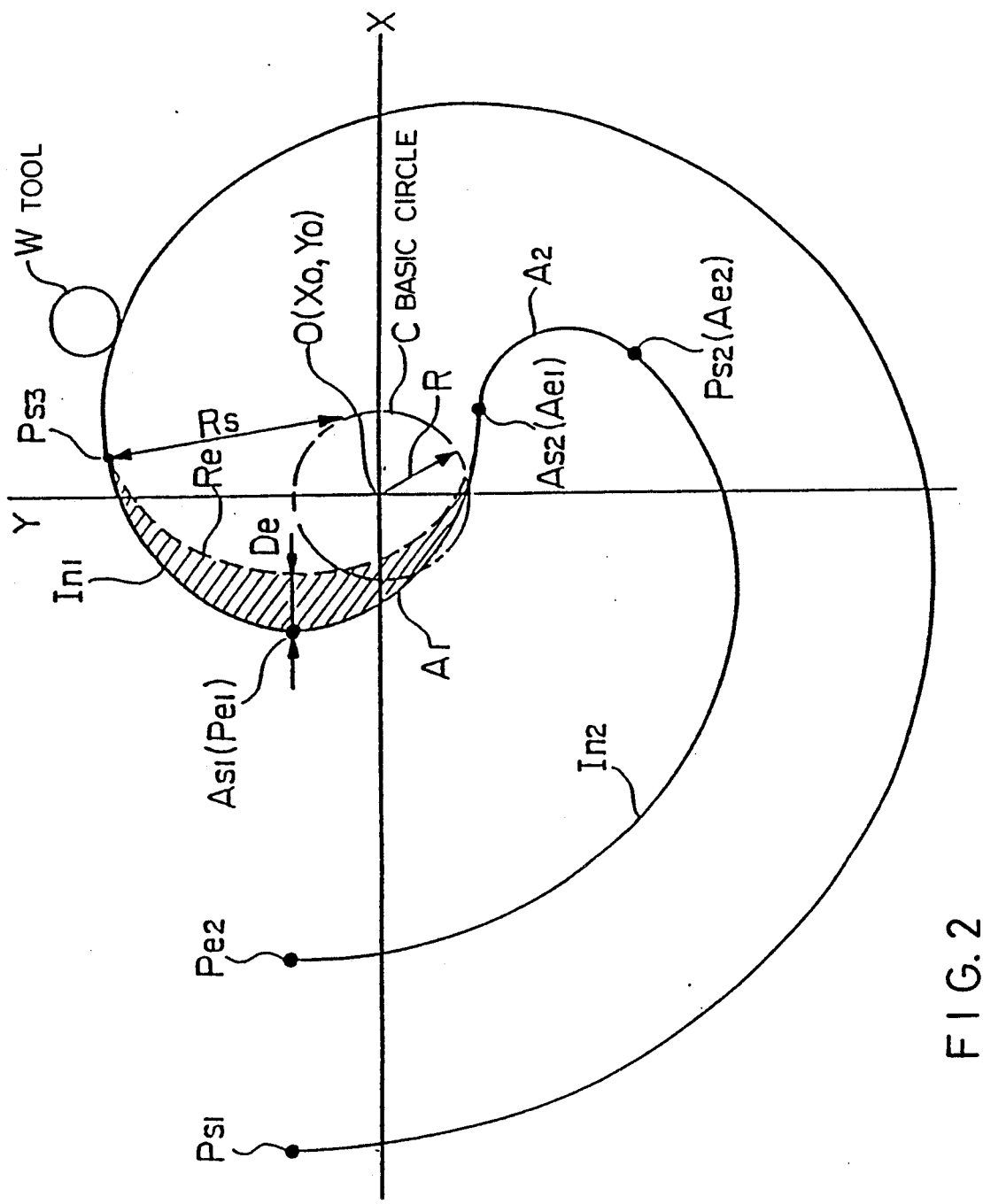
FIG. 2 is a diagram showing the manner of a machining based on a conventional involute interpolation.

In the present embodiment, after a trial cutting as shown in FIG. 2, an error amount De of a bite or leftover and a curvature radius Rs of a point Ps3 at which the bite starts are estimated and are set as parameters in a numerical control device. The error amount De is obtained by estimating the distance in the normal direction of the bite or leftover with respect to an end point Pe1 of an involute curve In1. The curvature radius Rs is obtained by estimating the distance from a basic circle to the start point Ps3 of the bite or leftover on the involute curve In1, on the basis of the basic circle C. Nevertheless, since the error amount De and the curvature radius Rs are values which are varied in accordance with various factors, such as the workpiece material, and tool type, etc., they must be decided on the basis of empirical values obtained by a trial cutting or the like.

Figure 1:
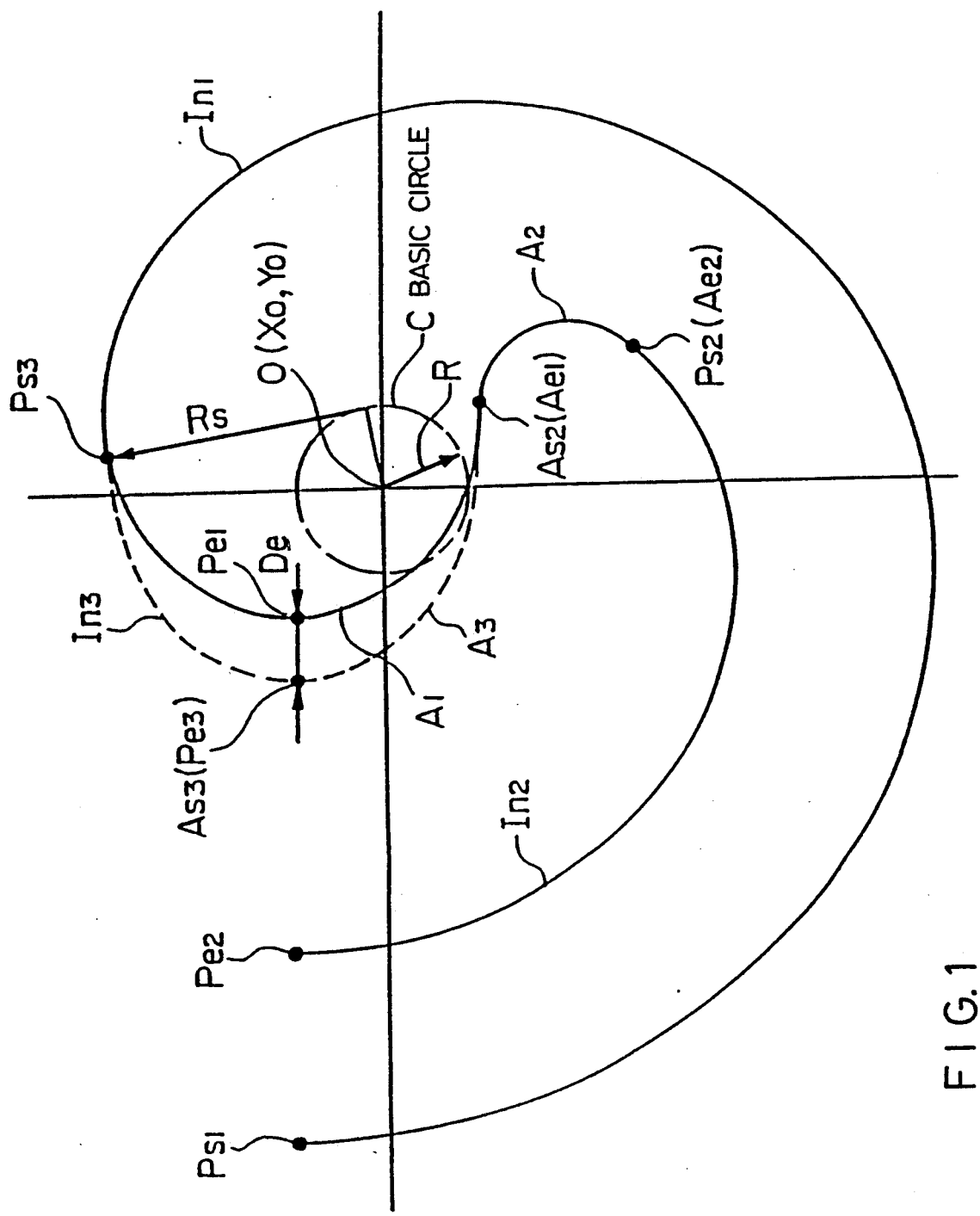
FIG. 1 is a diagram showing the manner of an involute interpolation according to an involute interpolation error correction system of the present invention.

FIG. 1 is a diagram showing the manner of an involute interpolation according to an involute interpolation error correction system of the present invention, which corresponds to FIG. 2. Since like symbols are used to designate the same elements as FIG. 2 shows, a description of those elements is omitted.

In FIG. 1, an involute curve In3 is an involute curve whose bite portion is corrected. The start point of this involute curve In3 is on the point Ps3 at which the bite starts, and the end point thereof is on a point Pe3 which is deviated from the point Pe1 by the error amount De in the normal direction.

An arcuate curve A3 is a corrected arcuate curve, the start point of which is shifted to a point As3 coincident with the point Pe3 by using the involute curve In3, and the end point of which is a point Ae1 coincident with that of an arcuate curve A1.

The following processes are executed in the numerical control device in accordance with the error amount De and the curvature radius Rs set as the parameters in the numerical control device in the aforementioned manner.

(a) The coordinates of the point Ps3 on the involute curve In1 are obtained on the basis of the curvature radius Rs.

(b) The end point Pe1 of the involute curve In1 is shifted to the point Ps3. Namely, the involute curve In1 is changed into a new involute curve which starts at a point Ps1 and terminates at the point Ps3.

(c) The involute curve In3 is obtained which starts at the point Ps3 and terminates at the point Pe3 shifted from the point Pe1 by the error amount De in the normal direction.

(d) The arcuate curve A1 is changed into the arcuate curve A3 which starts at the point As3 coincident with the point Pe3 and terminates at the end point Ae1 of the arcuate curve A1.

A bite-free involute curve can be interpolated by effecting an interpolation based on the involute curve obtained in the aforementioned series of processes.

The process (c) is executed according to an involute interpolation system described in Japanese Laid-Open Patent Publication No. 64-57313. Since the start point Ps3 and the end point Pe3 are not on the same involute curve, as in the case of the involute curve In3, a normal component of the involute curve is shifted by the error amount De in proportion to the winding angle of this involute curve, and as a result, the involute curves In1 and In3 can be smoothly connected.

The connection between the involute curve In1 and the arcuate curve A1 has been described in connection with the above embodiment. Note, if the involute curve is connected to any other command path, e.g., a straight line, spline curve, involute curve, etc., the two paths can be smoothly connected by changing the start point of the command path in a like manner.

Figure 3:
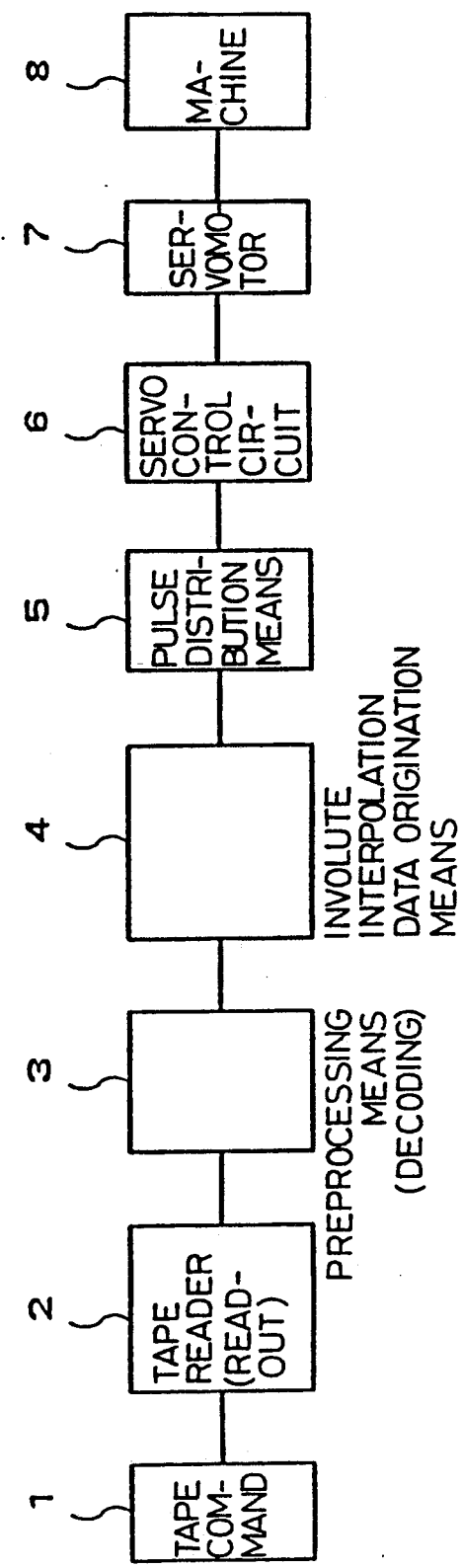
FIG. 3 is a diagram showing an outline of a numerical control device according to the present invention.

FIG. 3 shows a schematic diagram of a numerical control device according to the present embodiment. In FIG. 3, a tape command 1 is a tape punched with the aforementioned command. A tape reader 2 reads this tape 1; a preprocessing means 3 determines by a G-code whether an involute interpolation command exists; and an involute interpolation data origination means 4 originates data required for the aforementioned involute interpolation on the basis of the command value and the curvature radius Rs and the error amount De set as the parameters. A pulse distribution means 5 obtains each point on the involute curve from the data originated by using the involute interpolation data origination means 4, by incrementing Θ so that the tangential velocity of the involute curve is constant, in accordance with the aforementioned equation, performs an interpolation, and distributes pulses. A servo control circuit 6 drives a servomotor 7 in accordance with a command, and the servomotor 7 moves a machine 8 through a ball screw or the like.

Although the case of a bite has been described in connection with the above embodiment, in the case of a leftover cutting can be also effected with a corrected involute interpolation error in a like manner by setting the curvature radius of a point at which the leftover starts and the error amount of the leftover point as parameters.

According to the present invention, as described above, the command path of an involute curve can be automatically changed in accordance with the error amount of a bite or leftover, set as parameters in the numerical control device, and the curvature radius of the start point for correction, and a cut surface having a high-accuracy involute curve can be obtained without a bite or leftover.

What is claimed is:

1. A method of correcting an error attributable to an involute interpolation with a numerical control device said method comprising:

(a) obtaining in the numerical control device a curvature radius from a basic circle to a start point of a bite or leftover on a first involute curve and an error amount in a normal direction of the bite or leftover at an end point of the first involute curve, from an actual work shape created in accordance with a command for the first involute curve, when the work shape is liable to cause the bite or leftover; and (b) setting obtained values as parameters in the numerical control device and performing machining, with the numerical control device, based on an interpolation such that the first involute curve is divided between second and third involute curves, the second involute curve having an end point on the start point of the bite or leftover, and the third involute curve having a start point on the start point of the bite or leftover and having an end point deviated from the end point of the first involute curve by the error amount in the normal direction.

2. A method according to claim 1, wherein a start point of a curved or straight line starting at the end point of the first involute curve is shifted to the end point of the third involute curve when the curved or straight line is connected to the first involute curve.

3. A method according to claim 2, wherein the curved line is one of an arcuate curve, a spline curve, and an involute curve.

4. A method of machining with a corrected interpolation curve, comprising the steps of:

(a) performing machining based on a first involute curve to obtain an actual work shape;

(b) creating a second involute curve having an end point at the starting point of a deviation between the first involute curve and the actual work shape;

(c) creating a third involute curve having a starting point at the starting point of the deviation between the first involute curve and the actual work shape, and an end point a distance from the first involute curve which corresponds to the deviation between the first involute curve and the actual work shape at an end point of the first involute curve; and (d) performing machining corresponding to an interpolation based on the second and third involute curves.

* * * * *